(12) United States Patent
Park

(10) Patent No.: US 9,072,141 B2
(45) Date of Patent: Jun. 30, 2015

(54) DRIVING CIRCUIT FOR A LIGHT EMITTING DIODE LIGHTING APPARATUS

(75) Inventor: Soung Hwi Park, Anyang-si (KR)

(73) Assignee: POWER CHIPS CO., LTD., Seoul (KR)

( * ) Notice: Subject to any disclaimer, the term of this patent is extended or adjusted under 35 U.S.C. 154(b) by 206 days.

(21) Appl. No.: 13/997,285

(22) PCT Filed: Mar. 7, 2011

(86) PCT No.: PCT/KR2011/001564
§ 371 (c)(1),
(2), (4) Date: Sep. 11, 2013

(87) PCT Pub. No.: WO2012/086875
PCT Pub. Date: Jun. 28, 2012

(65) Prior Publication Data
US 2013/0342117 A1 Dec. 26, 2013

(30) Foreign Application Priority Data
Dec. 24, 2010 (KR) .................. 10-2010-0134427

(51) Int. Cl.
*H05B 37/00* (2006.01)
*H05B 33/08* (2006.01)

(52) U.S. Cl.
CPC .......... *H05B 33/0818* (2013.01); *H05B 33/083* (2013.01); *Y02B 20/348* (2013.01)

(58) Field of Classification Search
None
See application file for complete search history.

(56) References Cited

U.S. PATENT DOCUMENTS

| 8,324,840 B2 * | 12/2012 | Shteynberg et al. .......... 315/308 |
| 2012/0098448 A1 * | 4/2012 | Kang et al. .................... 315/201 |
| 2013/0207557 A1 * | 8/2013 | Park ............................... 315/186 |

FOREIGN PATENT DOCUMENTS

| CN | 101616521 | 12/2009 |
| KR | 10-2009-0083782 | 8/2009 |
| KR | 10-0941510 | 2/2010 |
| KR | 10-2010-0050908 | 5/2010 |
| KR | 10-2010-0056194 | 5/2010 |
| KR | 10-2010-0068418 | 6/2010 |

(Continued)

OTHER PUBLICATIONS

PCT Written Opinion for International Application No. PCT/KR2011/001564, dated Nov. 4, 2011.

(Continued)

*Primary Examiner* — Long Nguyen
(74) *Attorney, Agent, or Firm* — Kile Park Reed & Houtteman PLLC

(57) ABSTRACT

A driving circuit for a light emitting diode lighting apparatus includes a driving data memory device in which central portion driving data for driving the light emitting diodes are separated into many sections within one cycle of the driving power; a drive controller for reading the central driving data, charging driving data, and outer driving data stored in the driving data memory device; a first D/A converter for converting digital central driving data and outer driving data output from the drive controller to analog signals, and a second D/A converter for converting charging driving data to an analog signal; a static current driving device having static current driving devices respectively connected to tabs of light emitting diodes according to an output signal of the first D/A converter; and a charging static current driving device for charging the charging capacitor according to the output signal from the second D/A converter.

6 Claims, 4 Drawing Sheets

(56) References Cited

FOREIGN PATENT DOCUMENTS

| KR | 10-1083782 | 11/2011 |
|----|------------|---------|
| WO | 2010/078630 | 7/2010 |

OTHER PUBLICATIONS

PCT International Search Report of International Application No. PCT/KR2011/001564, dated Nov. 4, 2011.

* cited by examiner

US 9,072,141 B2

DRIVING CIRCUIT FOR A LIGHT EMITTING DIODE LIGHTING APPARATUS

BACKGROUND OF THE INVENTION

1. Field of the Invention

The present invention relates to a driving technique for a lighting apparatus with a light emitting diode (LED), and more particularly, to a driving circuit for a light emitting diode lighting apparatus, which is capable of illuminating an LED during the entire sections within each cycle of a pulsating current voltage, using a charging element such as a capacitor, when the LED is driven through the full-wave rectified pulsating current voltage.

2. Description of the Related Art

With the development of semiconductor technology, the efficiency of an LED has been significantly improved. Since the LED has a longer lifespan and smaller energy consumption than an existing lighting apparatus such as an incandescent lamp or fluorescent lamp, the LED is economical and environmentally-friendly. Due to such advantages, the LED is widely used as a traffic light or back light of a flat display device (for example, LCD).

In general, when the LED is used as a lighting apparatus, a plurality of LED modules each including a plurality of LEDs mounted therein are arranged in a specific manner, and then installed on the ceiling or wall surface. Each of the LED modules includes an AC/DC converter in consideration of the property of the LED which is driven by a direct current at a predetermined voltage. The above-described AC/DC converter includes a trans-coil for lowering an AC voltage. Since the trans-coil occupies a considerably large area in the LED module, a product to which the trans-coil is applied is inevitably increased in size.

In order to solve such a problem, a power supply unit referred to as a switching mode power supply (SMPS) has been conventionally used. According to the recent technology, however, the LED lighting apparatus is driven in such a manner that a plurality of LEDs are connected in series to lower a voltage for power, without using the SMPS.

The LED lighting apparatus rectifies an input AC power through a full-wave rectifier such as a bridge diode and directly illuminates an LED through a pulsating-current power. For reference, when the input AC power has a frequency of 60 Hz, the full-wave rectified pulsating current has a frequency of 120 Hz.

FIG. 1 illustrates a driving pattern of a conventional LED lighting apparatus. Referring to FIG. 1, a predetermined pattern of current is continuously supplied during a central section T2 where the voltage is equal to or more than a predetermined value in each cycle of a full-wave rectified pulsating current, thereby illuminating a corresponding LED. However, since no current is supplied during outer sections T1 and T3 where the voltage is equal to or less than the predetermined value, the corresponding LED is turned off.

In the conventional LED apparatus, when an LED is driven through the full-wave rectified pulsating voltage, the predetermined pattern of current is continuously supplied during the central section within each cycle of the pulsating-current power such that the corresponding LED is continuously illuminated. However, since no current is supplied in the outer sections, the LED is turned off. Since the operation of turning on/off the LED is performed at a very short cycle, the operation is not easily recognized with human eyes of users. However, when the human eyes are exposed to the operation for a long time, the operation may jangle the users' nerve, and thus the users may easily feel fatigue.

SUMMARY OF THE INVENTION

Accordingly, the present invention has been made in an effort to solve the problems occurring in the related art, and an object of the present invention is to provide a driving circuit for a light emitting diode lighting apparatus, which is capable of controlling a pulsating-current driving power to not drop below a predetermined value, using a charging capacitor such as a capacitor, thereby continuously illuminating an LED during outer sections within each cycle of the driving power, when an LED is driven through the full-wave rectified pulsating-current driving power.

In order to achieve the above object, according to one aspect of the present invention, there is provided a driving circuit of a light emitting diode (LED) lighting apparatus, including: a bridge diode rectifier configured to full-wave rectify an AC power and supply a pulsating-current driving power to an LED array including two or more LEDs connected in series; a driving data memory device in which central section driving data for driving the LEDs of the LED array are divided and stored for a plurality of sections within one cycle of the driving power and charging driving data for charging a charging capacitor in an outer section within one cycle of the driving power and outer section driving data for driving the LEDs of the LED array in the outer section are divided and stored for the respective sections; a drive controller configured to read the central section driving data, the charging driving data, and the outer section driving data from the driving data memory device and output the read data; a first D/A converter configured to convert the digital central section driving data and the outer section driving data, which are outputted from the drive controller, into an analog signal; a second D/A converter configured to convert the charging driving data into an analog signal; a constant current driving device unit including a plurality of constant current driving devices connected to taps of the LEDs of the LED array so as to selectively drive the LEDs in the central section and the outer section within one cycle of the driving power, according to an output signal of the first D/A converter; and a charging constant current driving device configured to charge the charging capacitor according to an output signal of the second D/A converter.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
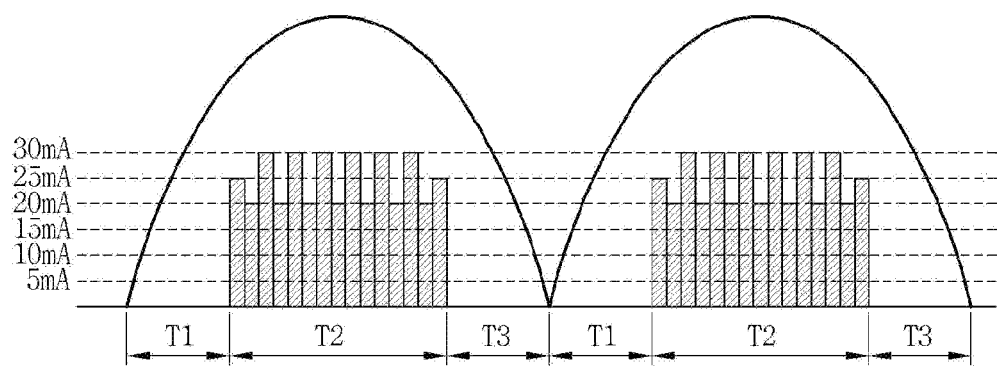
FIG. 1 illustrates a driving pattern of a conventional LED lighting apparatus.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
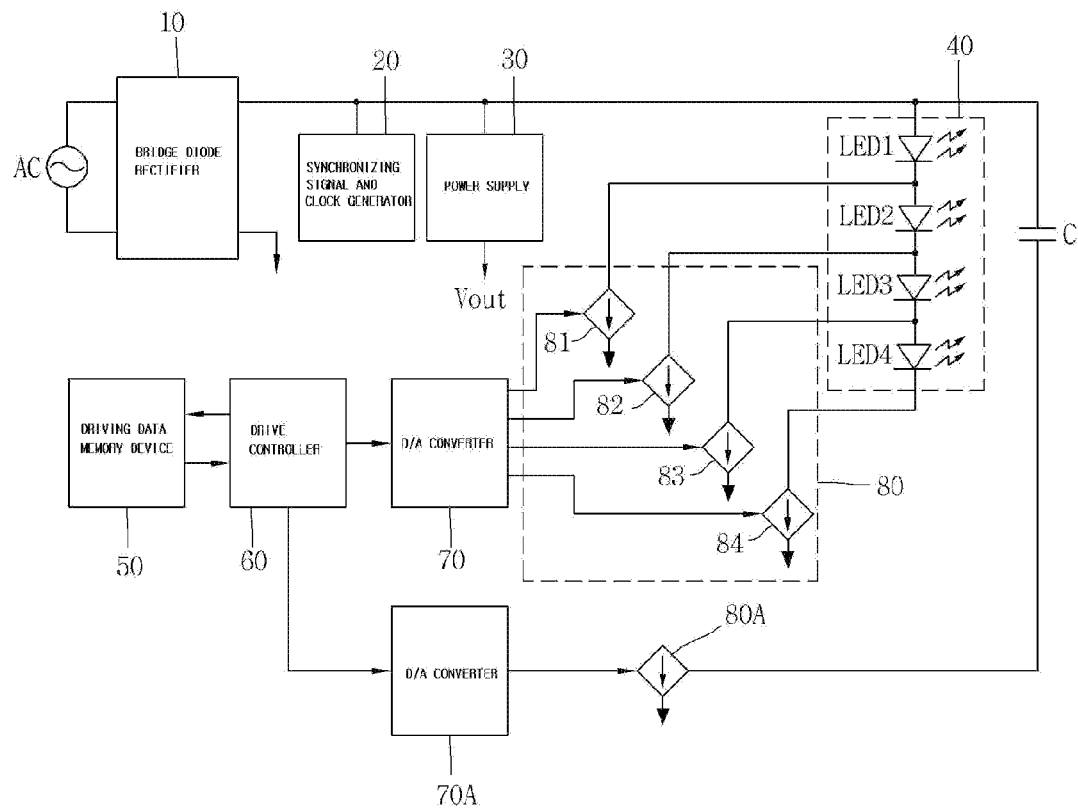
FIG. 2 is a block diagram illustrating a driving circuit of an LED lighting apparatus according to an embodiment of the present invention.

FIG. 2 is a block diagram illustrating a driving circuit of an LED lighting apparatus according to an embodiment of the present invention. Referring to FIG. 2, the driving circuit of the LED lighting apparatus includes a bridge diode rectifier 10, a synchronizing signal and clock generator 20, a power supply 30, an LED array 40, a driving data memory device 50, a drive controller 60, D/A converters 70 and 70A, a constant current driving device unit 80, a charging constant current driving device 80A, and a charging capacitor C.

Referring to FIG. 2, the bridge diode rectifier 10 is configured to full-wave rectify an input AC power and supply a pulsating-current driving power to the LED array 40.

The synchronizing signal and clock generator 20 is configured to detect the cycle of the power inputted from the bridge diode rectifier 10, generate a synchronizing signal based on the detected cycle, and generate a clock having a frequency several to several hundred times larger than the input power using the synchronizing signal. Furthermore, the synchronizing signal and clock generator 20 counts a clock which oscillates during one cycle of the input power, checks whether or not the counting value falls within an error range of a preset oscillation frequency, and adjusts the oscillation frequency such that the counting value falls within the error range, when the counting value does not fall within the error range.

The power supply 30 is configured to smooth the pulsating-current voltage outputted from the bridge diode rectifier 10, and convert the smoothed voltage into a voltage having a level required by each unit of the driving circuit of the LED lighting apparatus (for example, VCC or VDD).

The LED array 40 includes two or more LEDs LED1 to LED4 connected in series, and the LEDs have cathodes connected to corresponding constant current driving devices 81 to 84 through taps.

Figure 3:
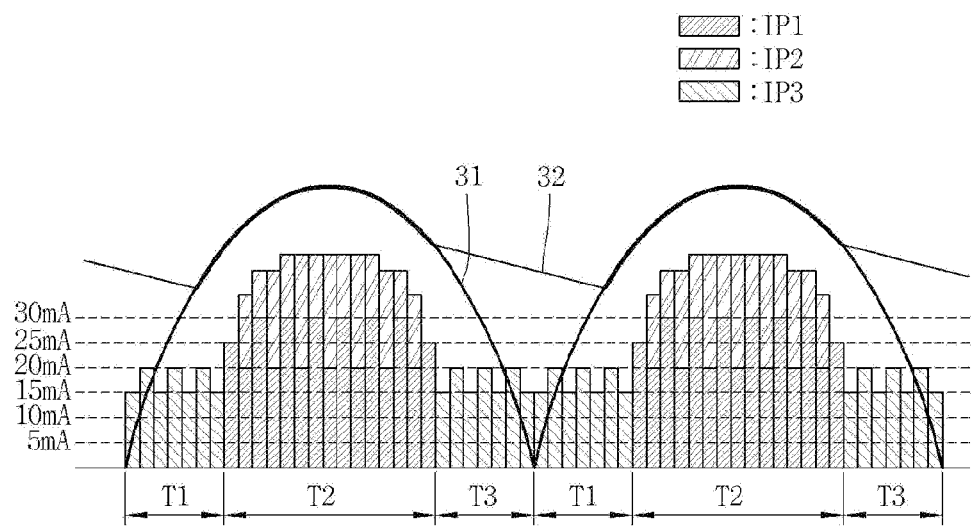
FIG. 3 is a diagram illustrating a driving pattern of the LED lighting apparatus according to the embodiment of the present invention.

The driving data memory device 50 is configured to store a specific pattern of central section driving data for driving the LEDs LED1 to LED4 of the LED array 40 such that the LEDs are driven with high efficiency and a high power factor and total harmonic distortion (THD) is reduced. When one cycle of the driving power (one half cycle of the input AC power) is divided into a plurality of sections as illustrated in FIG. 3, the central section driving data stored in the driving data memory device 50 includes selection information for selecting the constant current driving devices 81 to 84 in each of the sections, a current value which is to be passed by the selected constant current driving device during the corresponding section, the section width of each section, and the number of LEDs LED1 to LED4, the voltage and frequency of the input driving power, and the amount of power to be used. Furthermore, when storing the central section driving data, the driving data memory device 50 may store optimal driving data for each product in response to the characteristics of the LEDs, the number of connected LEDs, the voltage and frequency of the input driving power, the power to be used, the efficiency, power factor, and THD characteristic which correspond to various regulations. The driving data memory device 50 may store central section driving data of several channels at the same time.

The driving data memory device 50 additionally stores charging driving data for charging the charging capacitor C in a section T2 of the driving power of FIG. 3. Furthermore, the driving data memory device 50 additionally store outer section driving data for driving the LEDs LED1 to LED4 of the LED array 40 in sections T1 and T3 of the driving power of FIG. 3. The outer section driving data are stored in the driving data memory device 50 according to the same pattern as the central section driving data.

The drive controller 60 is configured to generate an address signal corresponding to the clock outputted from the synchronizing signal and clock generator 20, supply the generated address signal to the driving data memory device 50, and sequentially receive and output the current value and section width of the corresponding section and the selection information, which are stored at a corresponding address, from the driving data memory device 50.

The D/A converter 70 is configured to convert the selection information outputted from the drive controller 60 into an analog signal, and select a constant current driving device among the constant current driving devices 81 to 84 of the constant current driving device unit 80 using the converted select signal. Furthermore, the D/A converter 70 converts the current value and section width of the corresponding section, outputted from the drive controller 60, into an analog signal and outputs the analog signal to the selected driving device.

The constant current driving device unit 80 includes the plurality of constant current driving devices 81 to 84. The plurality of constant current driving devices 81 to 84 are connected to the taps (cathodes) of the LEDs LED1 to LED4, and connected to output terminals of the D/A converter 70, respectively.

The process in which the constant current driving devices 81 to 84 are driven according to the output signal of the D/A converter 70 will be described in more detail with reference to FIG. 3.

When one cycle of the driving power outputted from the bridge diode rectifier 10 is divided into a plurality of sections, the selection information, the current value, and the section width for each section are read from the driving data memory device 50 by the drive controller 60, and then outputted through the D/A converter 70.

When the constant current driving device 81 is selected in an arbitrary section according to the select signal (selection information) outputted from the D/A converter 70, the LED LED1 is illuminated with the corresponding current value and section width during the section.

When the constant current driving device 82 is selected in an arbitrary section according to the select signal (selection information) outputted from the D/A converter 70, the LEDs LED1 and LED2 are illuminated with the corresponding current value and section width during the section.

When the constant current driving device 83 is selected in an arbitrary section according to the select signal (selection information) outputted from the D/A converter 70, the LEDs LED1 to LED3 are illuminated with the corresponding current value and section width during the section.

When the constant current driving device 84 is selected in an arbitrary section according to the select signal (selection information) outputted from the D/A converter 70, the LEDs LED1 to LED4 are illuminated with the corresponding current value and section width during the section.

However, the drive controller 60 supplies a current IP1 to the LEDs LED1 to LED4 in the section T2 of the driving power as illustrated in FIG. 3 through the above-described series of processes, thereby illustrating the LEDs LED1 to LED4. The current IP1 corresponds to the central section driving data. Simultaneously, the drive controller 60 reads charging driving data from the driving data memory device 50 and outputs the read data to the D/A converter 70A, during the section T2.

Therefore, the D/A converter 70A converts the current value and section width of the section T2, outputted from the drive controller 60, into an analog signal and then outputs the analog signal to the charging constant current driving device 80A. Thus, the charging constant current driving device 80A controls the charging operation for the charging capacitor C according to the analog signal outputted from the D/A converter 70A and supplies a current IP2 to the capacitor C, during the section T2.

As a result, the driving power has a charging waveform 32 which is maintained in the form of a sine wave during the central section T2 and gently falls so as not to drop below a predetermined value during the outer sections T1 and T3, unlike the positive waveform 31 of the sine wave as illustrated in FIG. 3.

The drive controller 60 reads the outer section driving data for driving the LEDs LED1 to LED4 of the LED array 40 from the driving data memory device 50 and outputs the read data to the D/A converter 70 in the sections T1 and T3 of FIG. 3. Thus, the D/A converter 70 selects a constant current driving device among the constant current driving devices 81 to 84 of the constant current driving device unit 80 in response to the outer section driving data, converts the current value and section width of the corresponding section T1 or T3 into an analog signal, and outputs the analog signal to the selected driving device.

According to the above-described series of processes, a current IP3 is supplied to the LEDs LED1 to LED4 of the LED array 40 even during the outer sections T1 and T3 within one cycle of the driving power as illustrated in FIG. 3. Then, the corresponding LED may be continuously illuminated following the central section.

Figure 4:
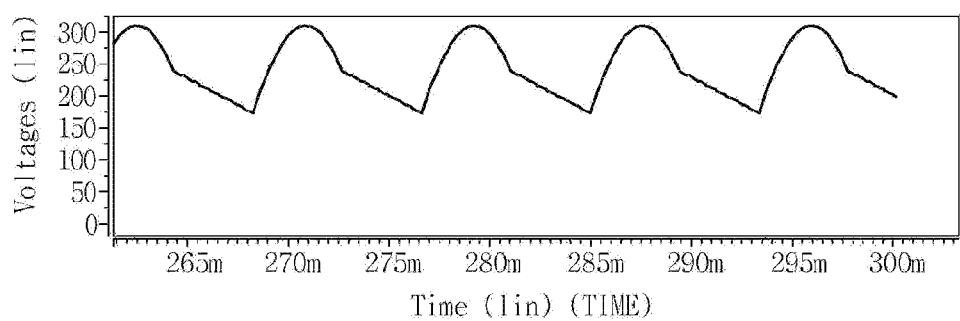
FIG. 4 illustrates a simulation waveform diagram for a charging voltage of a charging capacitor according to the embodiment of the present invention.

FIG. 4 illustrates a simulation result in which the charging capacitor C is charged with a voltage through the above-described series of processes. As described above, the waveform of the driving power gently falls so as not to drop below the predetermined value during the outer sections, through the charging operation for the capacitor C based on the above-described processes.

Figure 5:
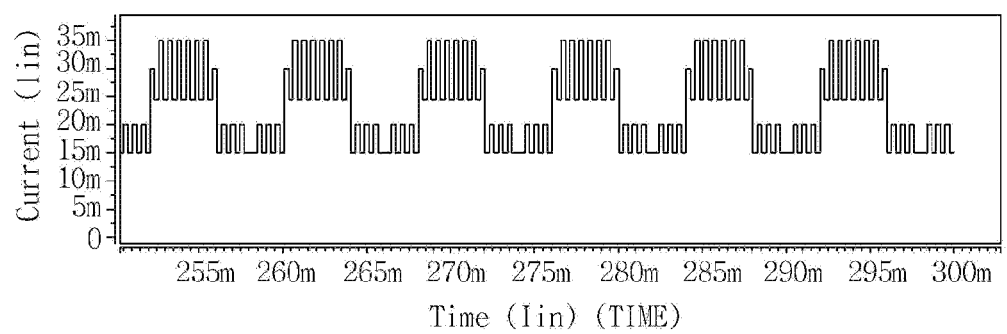
FIG. 5 illustrates a simulation waveform diagram in which the LEDs are illuminated during the entire sections according to the embodiment of the present invention.

FIG. 5 illustrates a simulation result in which the LEDs are illuminated during the entire sections through the above-described series of processes. As described above, the LED current is supplied during the entire sections within one cycle of the driving power.

According to the embodiments of the present invention, when an LED is driven through a full-wave rectified pulsating current, the driving circuit of the LED lighting apparatus controls the pulsating-current driving power to not drop below a predetermined value, using the charging element such as a capacitor, thereby continuously illuminating the LED even during the outer sections within one cycle of the driving power. Thus, even when the LED lighting apparatus is used for a long time, a user does not feel fatigue.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A driving circuit of a light emitting diode (LED) lighting apparatus, comprising:
    a bridge diode rectifier configured to full-wave rectify an AC power and supply a pulsating-current driving power to an LED array including two or more LEDs connected in series;
    a driving data memory device in which central section driving data for driving the LEDs of the LED array are divided and stored for a plurality of sections within one cycle of the driving power and charging driving data for charging a charging capacitor in an outer section within one cycle of the driving power and outer section driving data for driving the LEDs of the LED array in the outer section are divided and stored for the respective sections;
    a drive controller configured to read the central section driving data, the charging driving data, and the outer section driving data from the driving data memory device and output the read data;
    a first D/A converter configured to convert the digital central section driving data and the outer section driving data, which are outputted from the drive controller, into an analog signal;
    a second D/A converter configured to convert the charging driving data into an analog signal;
    a constant current driving device unit comprising a plurality of constant current driving devices connected to taps of the LEDs of the LED array so as to selectively drive the LEDs in the central section and the outer section within one cycle of the driving power, according to an output signal of the first D/A converter; and
    a charging constant current driving device configured to charge the charging capacitor according to an output signal of the second D/A converter.

2. The driving circuit of claim 1, wherein the LED array comprises the two or more LEDs connected in series, and one or more LEDs are connected to the constant current driving devices through taps thereof.

3. The driving circuit of claim 2, wherein the tap is connected to a cathode of the corresponding LED.

4. The driving circuit of claim 1, wherein the central section driving data and the outer section driving data are patterned in such a manner that the LEDs of the LED array are driven with high efficiency and a high power factor and total harmonic distortion is reduced.

5. The driving circuit of claim 1, wherein the charging capacitor has one terminal connected to an output terminal of the bridge diode rectifier and the other terminal connected to an output terminal of the constant current driving device to charge the charging capacitor.

6. The driving circuit of claim 1, wherein the charging constant current driving device charges the charging capacitor in the central section within one cycle of the driving power.

* * * * *